June 27, 1939.    M. BEREK    2,164,028
PHOTOGRAPHIC OBJECTIVE
Filed July 21, 1937
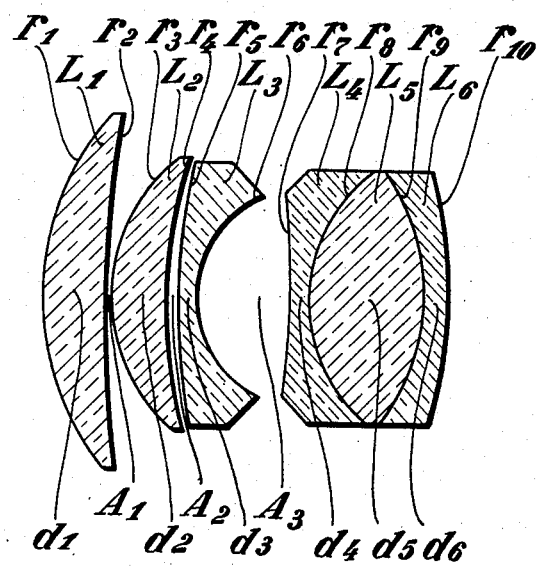
INVENTOR
Max Berek
BY
Ivan E. A. Konigsberg
ATTORNEY Patented June 27, 1939

2,164,028

UNITED STATES PATENT OFFICE 2,164,028

PHOTOGRAPHIC OBJECTIVE

Max Berek, Wetzlar, Germany, assignor to Ernst Leitz, G. m. b. H., Wetzlar, Germany Application July 21, 1937, Serial No. 154,710
In Germany August 13, 1936

1 Claim. (Cl. 88—57)

Photographic objective systems with large apertures and intended to include very great fields require a construction whereby a very small Petzval sum can be obtained. The Petzval sum may be defined as follows: Let $r$ be the radius of the curvature of a lens surface facing the incident light and $n$ the refractive index before the light passes through this surface while $n'$ is the refractive index after passing the light through this surface, then the following term expresses the Petzval sum taken over all the surfaces of the system:

$$-\frac{1}{r}\left(\frac{1}{n'}-\frac{1}{n}\right)$$

Objective systems in which the Petzval sum can be kept small are known. But such systems are either intended for small apertures or they are systems in which distortion cannot be corrected or they are subject to disadvantageous reflections. In systems which are intended for a very great field with satisfactory aperture, it is necessary to obtain a very small Petzval sum to correct the spherical aberration over a greater aperture and the distortion, the astigmatism and the coma over a great field and also to reduce to a minimum the tendency to form internal reflections. If such a system comprises eight air-exposed surfaces and the four first surfaces are collective and the next two surfaces dispersive, such difficulties may be caused to disappear or to be materially diminished in accordance with the object of this invention as hereinafter set forth.

The invention is embodied in an objective lens system such, for instance, as is shown in the accompanying drawing in which the system comprises four lens bodies having eight exterior surfaces. The lenses are marked $L_1$, $L_2$, etc. The distances between the lenses are marked $A_1$, $A_2$ and $A_3$. The axial dimensions are marked $d_1$, $d_2$, etc. The radii of curvature are marked $r_1$, $r_2$, etc. The system is characterized by the features hereinafter set forth in accordance with the invention.

The system consists of four members. The first and the second members are each formed by a simple collective lens. The third member is a simple dispersive lens. All the surfaces of the said three members are convex towards the incident light. The fourth member is a triple lens consisting of two exterior dispersive lenses cemented to an interior biconvex lens and at least the cemented surface which faces the incident light is collective. This construction is advantageous for correcting the system.

Objective systems comprising four lens members are known. See for instance British Patent 408,787/1933. The system therein disclosed has a very large Petzval sum, namely 0.48 with which a very large field cannot be corrected without resulting in great curvature. Another British Patent, 427,008 shows some similarities to the present invention. However both of the patented disclosures referred to cannot be used for the purposes of this invention.

The particular characteristics which distinguish my invention are as follows. The radii of the fourth and fifth surfaces which enclose the lens shaped air space between the second and the third member of the system are both convex towards the incident light and the radius of the rear surface of this air lens is greater than the radius of the front surface thereof by at least 30 percent. Again, said radius—to the rear of the air lens—must not exceed double the focal length of the whole system. On the other hand this radius is at least five times, but not more than ten times the length of the radius of the rear surface of the third members.

Another characteristic feature is that the focal length of the second lens member must be at least one-half of but not equal to the focal length of the first member and the total focal length of the three first members must be less than three times the focal length of the whole system.

The following table contains the data for a lens system with a focal length of $l$ according to my invention. The radii, thicknesses and separations are given in terms of the focal length of the system. The radius is reckoned plus when convex to the incident light.

| Radii | Lens thickness | Air space | Refractive power |
|---|---|---|---|
| $r_1 = +0.506$ | $d_1 = 0.133$ | $A_1 = 0.003$ | $L_1 = -1.603/61$ |
| $r_2 = +2.51$ | $d_2 = 0.107$ | $A_2 = 0.027$ | $L_2 = -1.670/47$ |
| $r_3 = +0.320$ | $d_3 = 0.036$ | $A_3 = 0.187$ | $L_3 = -1.689/31$ |
| $r_4 = +0.770$ | $d_4 = 0.036$ | | $L_4 = -1.501/57$ |
| $r_5 = +1.271$ | $d_5 = 0.231$ | | $L_5 = -1.670/47$ |
| $r_6 = +0.1986$ | $d_6 = 0.044$ | | $L_6 = -1.673/32$ |
| $r_7 = -2.62$ | | | |
| $r_8 = +0.287$ | | | |
| $r_9 = -0.356$ | | | |
| $r_{10} = -0.855$ | | | |

The data given in the following table shows, by means of the so-called Seidel's coefficients, how a lens of the given data may be constructed to provide a system according to this invention. The first column gives the "specific power" of each surface. This specific power indicates the percentage of the total power of the whole system of each surface according to its collective or dispersive action.

| Number of face | Specific power $\phi$ | Seidel's coefficients |  |  |  |  |
|---|---|---|---|---|---|---|
|  |  | A | B | r | P | Δ |
| 1 | +0.74 | +1.82 | +0.92 | +0.46 | +0.74 | +0.61 |
| 2 | +0.23 | +0.18 | −0.30 | +0.51 | −0.15 | −0.62 |
| 3 | +0.74 | +0.15 | +0.10 | +0.07 | +1.26 | +0.93 |
| 4 | +0.53 | +1.49 | −1.30 | +1.13 | −0.52 | −0.53 |
| 5 | −0.70 | −2.58 | +1.64 | −1.04 | +0.32 | +0.45 |
| 6 | −1.03 | −1.52 | −1.47 | −1.42 | −2.05 | −3.36 |
| 7 | −0.23 | −0.08 | +0.15 | −0.29 | −0.13 | +0.80 |
| 8 | +0.15 | +0.16 | +0.32 | +0.62 | +0.23 | +1.65 |
| 9 | −0.00 | −0.00 | −0.00 | −0.00 | −0.00 | −0.00 |
| 10 | +0.58 | +0.59 | +0.04 | +0.00 | +0.47 | +0.03 |
| Sum | +1.01 | +0.21 | +0.10 | +0.04 | +0.17 | −0.04 |

This specific power is calculated in the following manner: The passage of a ray of light emanating from a point at infinity on the axis of the system is calculated through the system in a known manner. Let $s_\nu$ be the length of intersection for this ray measured on the axis before the ray passes through the surface having the index $\nu$ and related to the vertex of this surface. Also let $s'_\nu$ be the length of intersection of this ray after it passes through the same surface and also related to the same vertex, then the auxiliary quantities are calculated successively according to the following general equation:

$$\frac{h_\nu}{h_1} = \frac{s_2}{s_1} \cdot \frac{s_3}{s_2} \cdot \frac{s_4}{s_3} \cdots \frac{s_\nu}{s_{\nu-1}}$$

and utilizing the same for each individual auxiliary quantity as follows:

$$\frac{h_1}{h_1} = 1; \frac{h_2}{h_1} = \frac{s_2}{s_1}; \frac{h_3}{h_1} = \frac{s_2}{s_1} \cdot \frac{s_3}{s_2};$$

$$\frac{h_4}{h_1} = \frac{s_2}{s_1} \cdot \frac{s_3}{s_2} \cdot \frac{s_4}{s_3}$$

and so on. The specific power of each surface is given by $$\varphi_\nu = \frac{h_\nu}{h_1}\left(\frac{1}{s'_\nu} - \frac{1}{s_\nu}\right)$$

The addition of the specific powers of all the surfaces result in the total power of the whole system which in the given example has the value 1.000. The specific powers also indicate the percentage of the whole power which is a result of the actions of each surface.

The five other columns in the same table give the Seidel's coefficients of spherical aberrations A, coma B, astigmatism r, curvature of field P and distortion Δ for each surface. The total sums in each column give the resulting value of the whole system. It is easily seen that the coefficients for each single surface are so distributed as to approximate by addition nearly zero in each column. When the system is to be corrected for a large aperture and a larger field it is inconvenient to distribute the coefficients in such a manner that the sum in each column is strictly zero. But it is important that each coefficient for a single surface does not exceed a certain value depending upon the desired aperture and the desired field. The table shows clearly the smallness of these coefficients and also the compensating action of the surfaces in relation to the different aberrations and therefore evidences the possibility of obtaining a good corrected system by the described invention.

The calculation of these coefficients is rather complicated to describe. They are however easily done. Let $n_\nu$ and $n'_\nu$ be the refractive indices in the medium in front of and behind the surface $\nu$. Let $r$ be the radius of curvature of the surface $\nu$ then the coefficient $A_\nu$ for a surface $\nu$ is calculated from the following equation:

$$A_\nu = \left(\frac{h_\nu}{h_1}\right)^4 \left\{n_\nu\left(\frac{1}{r_\nu} - \frac{1}{s_\nu}\right)\right\}^2\left(\frac{1}{n'_\nu s'_\nu} - \frac{1}{n_\nu s_\nu}\right)$$

Further calculate the auxiliary quantities for each surface $\nu$ as follows:

$$\epsilon_\nu = \frac{1}{\left(\frac{h_\nu}{h_1}\right)^2 n_\nu\left(\frac{1}{r_\nu} - \frac{1}{s_\nu}\right)}$$

$$\delta_\nu = \sum_{\mu=2}^{\mu=\nu} \frac{d_{\mu-1}}{n_\mu \times \frac{h_{\mu-1}}{h_1} \times \frac{h_\mu}{h_1}}$$

In which $d_{\mu-1}$ is the distance between the vertices of the two adjacent surfaces $\mu-1$ and $\mu$. The addition symbolized by Σ, must be carried out beginning from the surface $\mu=2$ to the surface $\mu=\nu$. Further, for each surface let $\iota = \epsilon_\nu + \delta_\nu$, then the other coefficients are calculated successively from the above.

I claim:

An objective lens system for photography intended for large apertures and large fields, corrected for spherical and chromatical aberrations and also for coma, astigmatism and distortion comprising four members, the first and second members being simple collective lenses, the third member being a simple dispersive lens and the fourth member being a triple lens consisting of two exterior dispersive lenses cemented to an interior biconvex lens with at least the front cemented surface thereof collective, characterized in that all the surfaces of the three first members are convex toward the incident light; the focal length of the second member is at least one half of but not equal to the focal length of the first member; the total focal lengths of the three first members is less than thrice the focal length of the whole system; the radius of curvature of the fifth lens surface in the system is at least thirty per cent longer than the radius of the fourth surface thereof and said fifth radius is at the most twice the focal length of the whole system and is also at least five times and at the most ten times greater than the radius of the sixth surface of said system.

MAX BEREK.